(12) United States Patent
Bog et al.

(10) Patent No.: US 12,157,188 B2
(45) Date of Patent: Dec. 3, 2024

(54) WELD BEAD INSPECTION DEVICE

(71) Applicant: AGRU KOREA CO., LTD., Gwangju-si (KR)

(72) Inventors: Min-Gab Bog, Daejeon (KR); Hyeon Seop Park, Daejeon (KR); Na Yeong Park, Daejeon (KR); Kyoung Hwan Heo, Daejeon (KR); Hyun Beom Jeong, Gwangju-si (KR); Seong-Gyu Hwang, Gwangju-si (KR); Hyun Soo Kim, Hanam-si (KR)

(73) Assignee: AGRU KOREA CO., LTD., Gwangju-si (KR)

( * ) Notice: Subject to any disclaimer, the term of this patent is extended or adjusted under 35 U.S.C. 154(b) by 29 days.

(21) Appl. No.: 18/001,460

(22) PCT Filed: Jun. 14, 2021

(86) PCT No.: PCT/KR2021/007397
§ 371 (c)(1),
(2) Date: Dec. 9, 2022

(87) PCT Pub. No.: WO2021/251803
PCT Pub. Date: Dec. 16, 2021

(65) Prior Publication Data
US 2023/0226646 A1   Jul. 20, 2023

(30) Foreign Application Priority Data

Jun. 12, 2020  (KR) ........................ 10-2020-0071651
Jun. 13, 2021  (KR) ........................ 10-2021-0076407

(51) Int. Cl.
*B23K 31/00*    (2006.01)
*B23K 31/12*    (2006.01)
(Continued)

(52) U.S. Cl.
CPC ........ *B23K 31/125* (2013.01); *B23K 37/0276* (2013.01); *G06T 7/0004* (2013.01); *B23K 2101/06* (2018.08); *G06T 2207/30164* (2013.01)

(58) Field of Classification Search
CPC .............. B23K 31/125; B23K 37/0276; B23K 2101/06; B23K 31/02; G06T 7/0004;
(Continued)

(56) References Cited

U.S. PATENT DOCUMENTS

2017/0276260 A1* 9/2017 Bonel .................... F16L 13/02
2018/0001422 A1* 1/2018 Rajagopalan ........ B23K 26/282
2023/0137583 A1* 5/2023 Bog ..................... G06V 10/141

FOREIGN PATENT DOCUMENTS

CA    2995952 A1 * 12/2018  .......... B23K 26/044
CN   102695453 B  *  1/2016  .......... B23K 31/125
(Continued)

*Primary Examiner* — Kiley S Stoner

(57) ABSTRACT

The present invention relates to a weld bead inspection device that inspects welding quality by measuring the state of beads formed at a welding part of a metallic or non-metallic pipe, or the like, and more specifically, to a weld bead inspection device that more efficiently inspects a welding part joined by a method such as thermal fusion for connection between pipes or connection between a pipe and a fitting. The weld bead inspection device includes a housing unit that forms an appearance; an imaging unit that images shapes of the weld beads in an inner space that is open downward from a middle inner side of the housing unit; a control unit that is provided in the housing unit to store image data captured by the imaging unit or to calculate external shapes of the weld beads for determining welding quality on the basis of the image data.

11 Claims, 12 Drawing Sheets

(51) Int. Cl.
*B23K 37/02* (2006.01)
*G06T 7/00* (2017.01)
*B23K 101/06* (2006.01)

(58) Field of Classification Search
CPC .......... G06T 2207/30164; G01N 21/95; G01N 21/952; G01N 21/8806; G01N 33/227; G01N 2203/0296
USPC ...................... 228/44.5, 49.3, 102–105, 8–12
See application file for complete search history.

(56) References Cited

FOREIGN PATENT DOCUMENTS

| | | | | | |
|---|---|---|---|---|---|
| CN | 109682757 | A | * | 4/2019 | |
| CN | 111610196 | A | * | 9/2020 | ............. G01B 11/06 |
| CN | 112264704 | A | * | 1/2021 | ......... B23K 26/0823 |
| JP | 3546242 | B2 | * | 7/2004 | |
| KR | 101244179 | B1 | * | 3/2013 | |
| KR | 101309641 | B1 | * | 9/2013 | |
| KR | 20200102797 | A | * | 9/2020 | |
| WO | WO-2016026969 | A1 | * | 2/2016 | ............. B23K 31/02 |
| WO | WO-2021215802 | A1 | * | 10/2021 | ............. B23K 31/12 |

* cited by examiner (a)

(b)

C-C

WELD BEAD INSPECTION DEVICE

CROSS REFERENCE TO RELATED APPLICATIONS

The present application is a National Phase of International Application No. PCT/KR2021/007397 filed on Jun. 14, 2021, which claims the priority based on Korean Patent Application No. 10-2020-0071651 filed on Jun. 12, 2020 and Korean Patent Application No. 10-2021-0076407 filed on Jun. 13, 2021, and the entire contents disclosed in the description and drawings of the corresponding applications are referenced in the present application.

TECHNICAL FIELD

The present invention relates to a weld bead inspection device that inspects welding quality by measuring the state of beads formed at a welding part of a metallic or non-metallic pipe, or the like, and more specifically, relates to a weld bead inspection device that more efficiently inspects a welding part joined by a method such as thermal fusion for connection between pipes or the connection between a pipe and a fitting.

BACKGROUND OF THE INVENTION

In general, welding is performed for making direct atomic bonds between objects or members to join the objects or members to each other, and is widely used for joining metal materials. In addition to this, a welding joining method such as thermal fusion is employed for the connection between pipes including metallic or non-metallic pipes or connection between a pipe and a fitting.

For example, in the case of facilities where industrial processes using special fluids such as chemicals are performed, plastic or composite materials (hereinafter collectively referred to as 'plastic') are often used as the material of the pipes. A method widely used for the connection between pipes, the connection between a pipe and a fitting, or the like is a welding method through thermal fusion.

Conventionally, non-destructive inspection using ultrasonic waves is mainly used as a method of inspecting a welding part. In this regard, a conventional ultrasonic weld bead inspection device is a device that inspects weld beads of a steel structure using a digital ultrasonic flaw detector. This device includes a probe for inspecting the welding part, and a device that digitizes and displays a result detected by the probe.

However, in order to perform an inspection on a joining surface between pipes using this method, an inspection device including expensive components such as an ultrasonic projector should be provided, and a method of analyzing the measured ultrasound image is also required.

In addition, conventional devices for analyzing ultrasonic images are configured to measure the quality of the joining surface using ultrasonic waves, and require a device for projecting the ultrasonic waves and a device for converting signals captured by the ultrasonic waves into images. However, there are problems in that these devices are bulky, expensive, heavy, and difficult to manage.

In addition, since the result of ultrasonography of the joining surface is not clear, it is difficult for non-experts to recognize the image result.

Therefore, in the quality inspection of the joining surface between the pipes or the like, there is a need for a quality inspection device capable of performing the quality inspection of the joining surface between the pipes by using a device capable of simply imaging a welding part formed on the joining surface and digitally analyzing the result without using ultrasonic waves, and capable of increasing accuracy and presenting reliable and accurate results even to non-experts.

DETAILED DESCRIPTION OF THE INVENTION

Technical Challenges

Accordingly, the present invention has been made to improve the above conventional problems, and an object thereof is to provide a device that measures welding quality through imaging of a welding joining part of an outer periphery of a pipe rather than through a method of performing measurement using ultrasonic waves in the inspection of the welding joining part, thereby inspecting the joining part using a method of comparing digitalized data with standard data on the basis of simple imaging for the joining part without requiring an ultrasound generator.

In addition, another object of the present invention is to provide a weld bead inspection device that is easy to carry by configuring the device in a small size and is capable of maximally inspecting the welding part to be inspected between complex pipe lines.

In addition, still another object of the present invention is to provide a weld bead inspection device that can be used even by non-experts in welding inspection work by enabling sharing of an imaged result using a communication network.

In addition, a still further object of the present invention is to provide a weld bead inspection device that makes it easy to determine defects that are difficult to visually determine through close-up imaging of the welding part and consequently increases the accuracy of the inspection determination rate.

In addition, a still further object of the present invention is to provide a weld bead inspection device that can stably inspect the welding part in an attachable or standing manner with respect to the welding part, which is not measured by holding the welding part by hand, so that the user's convenience is improved.

In addition, a still further object of the present invention is to provide a weld bead inspection device that can smoothly inspect a pipe having a changed dimension even in a case where the pipe does not have a predetermined standard size in welding inspection, and can constantly maintain excellent measurement quality in the imaged result by preventing shaking and incidence of external light from the outside in bead imaging.

In addition, a still further object of the present invention is to provide a weld bead inspection device that is configured such that an imaging part for inspection is biased to one side of the device and that is reduced in inconvenience of use even in a narrow space, such as a welding part for elbow connection among welding parts for joining pipes.

Technical Solution

In order to achieve the above technical challenges, a weld bead inspection device according to an aspect of the present invention is a weld bead inspection device that inspects weld beads on an outer surface of a pipe. The weld bead inspection device includes a housing unit that forms an appearance; an imaging unit that images shapes of the weld beads in an inner space that is open downward from a middle inner side of the housing unit; a control unit that is provided in the housing unit to store image data captured by the imaging unit or to calculate external shapes of the weld beads for determining welding quality on the basis of the image data. The imaging unit is configured such that the imaging unit images appearances of the weld beads in a tangential direction of the pipe.

In addition, in the weld bead inspection device according to the aspect of the present invention, the imaging unit may include an image sensor unit that measures an image of the appearances of the weld beads in the tangential direction of the pipe; and an illumination unit that provides illumination for measuring the image, and the illumination unit may set a direction or range of the illumination such that an opposite side facing the image sensor unit has a dark background.

In addition, in the weld bead inspection device according to the aspect of the present invention, the imaging unit may further include a background member, which forms a background in the image, on the opposite side facing the image sensor unit.

In addition, in the weld bead inspection device according to the aspect of the present invention, the background member may be formed to have a length longer than such a length that the background member comes into contact with an outer surface of the pipe, and at least a portion of the background member coming into contact with the outer surface of the pipe may be formed of a soft material such that incidence of light from the outside of the housing unit is blocked.

In addition, in the weld bead inspection device according to the aspect of the present invention, the imaging unit may further include a calibration member provided with standard scales or patterns such that actual external dimensions of the weld beads are capable of being recognized from the image measured by the image sensor unit.

In addition, the weld bead inspection device according to the aspect of the present invention may further include a withdrawal supporting unit that maintains an imaging position for the weld beads by the imaging unit in response to a change in size of the pipe.

In addition, in the weld bead inspection device according to the aspect of the present invention, the withdrawal supporting unit may be configured to include a supporting block that is provided to be capable of being withdrawn to the front and rear of the housing unit on the basis of the imaging position for the weld beads and supported on an outer surface of the pipe; and a fixing knob that temporarily fixes the supporting block in a state in which the supporting block is withdrawn to such a length that the fixing knob comes into contact with the outer surface of the pipe.

In addition, in the weld bead inspection device according to the aspect of the present invention, the withdrawal supporting unit may have a rolling wheel at an end part of the supporting block and may be supported on the outer surface of the pipe by the rolling wheel.

In addition, in the weld bead inspection device according to the aspect of the present invention, the withdrawal supporting unit may be configured to further include a suspension that maintains an original state in which the supporting block is withdrawn from the housing unit and that elastically supports the supporting block with respect to the housing part so as to be retracted into the housing unit by contact and pressurization with the outer surface of the pipe.

In addition, in the weld bead inspection device according to the aspect of the present invention, the withdrawal supporting unit may further include an adjustment knob that drives the withdrawal and retraction of the supporting block, and at least one of the housing unit and the adjustment knob may be provided with a scale indicator light that guides a withdrawal dimension of the supporting block or guides a dimension of the pipe corresponding to the withdrawal dimension.

In addition, the weld bead inspection device according to the aspect of the present invention may be configured to further include a bead tracking guide part that guides the weld bead inspection device to travel along the weld beads when the weld bead inspection device travels on the outer surface of the pipe.

In addition, in the weld bead inspection device according to the aspect of the present invention, the bead tracking guide part may be configured to include a bead facing part installed on at least one outer side surface of both outer side surfaces of the weld beads, and the bead facing part may be installed such that an installation position thereof is adjustable, or be installed in an elastic mount structure.

In addition, in the weld bead inspection device according to the aspect of the present invention, the weld bead inspection device may be formed such that the weld beads imaged by the imaging unit are capable of traveling along an outer peripheral surface of the pipe in a posture where the weld beads are located to be biased in a lateral direction of the housing unit Effects of the Invention As described in the above configuration and operation, the weld bead inspection device according to the present invention has the effect of measuring the welding quality through imaging of the welding joining part of the outer periphery of the pipe rather than through the method of performing measurement using ultrasonic waves in the inspection of the welding joining part, thereby inspecting the joining part using the method of comparing digitalized data with standard data on the basis of simple imaging of the joining part without requiring an ultrasound generator.

In addition, the present invention has the effect of being easy to carry by configuring the device in a small size and being capable of easily inspecting the welding part to be inspected between complex pipe lines, and has the effect of being capable of being used even by non-experts in welding inspection work by enabling sharing of the imaged result using a communication network.

In addition, the present invention has the effect of making it easy to determine defects that are difficult to visually determine through close-up imaging of the welding part and consequently increasing the accuracy of the inspection determination rate, and has the effect of being capable of stably inspecting the welding part in an attachable or standing manner with respect to the welding part, which is not measured by holding the welding part by hand, so that the user's convenience is improved.

In addition, the present invention has the effect of being capable of smoothly inspecting a pipe having a changed dimension even in a case where the pipe does not have a predetermined standard size in welding inspection and being capable of constantly maintaining excellent measurement quality in the imaged result by preventing shaking and incidence of external light from the outside in bead imaging.

In addition, the present invention has the effect of being configured such that an imaging part for inspection is biased to one side of the device and being reduced in inconvenience of use even in a narrow space, such as a welding part for elbow connection among welding parts for joining pipes.

The effects of the present invention are not limited to the above effects, and it should be understood to include all effects that can be inferred from the configuration of the invention described in the detailed description or the claims of the present invention.

BEST MODES FOR CARRYING OUT THE INVENTION

Figure 1:
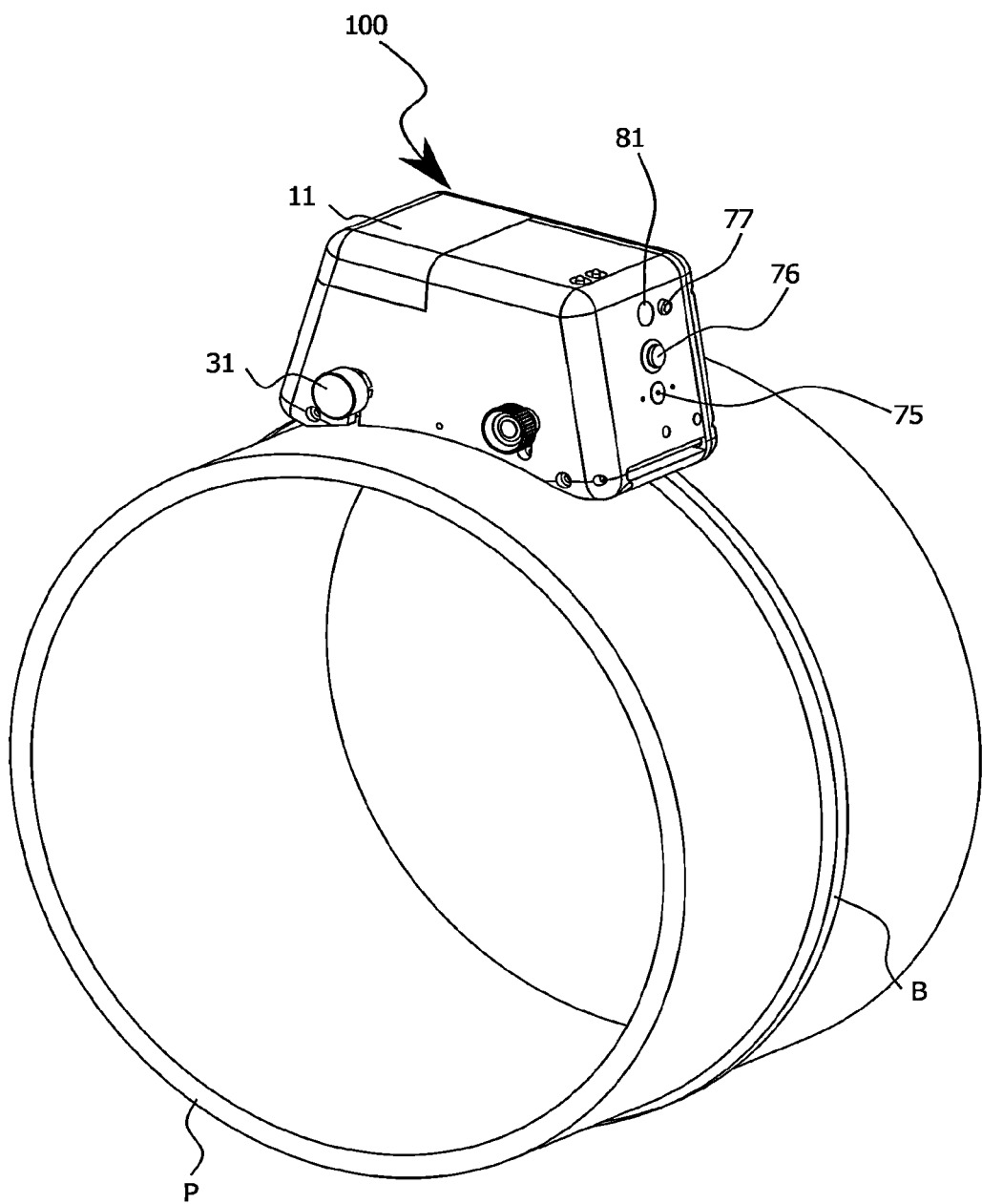
FIG. 1 shows an example of use of a weld bead inspection device according to an embodiment of the present invention.

Hereinafter, the present invention will be described with reference to the accompanying drawings. However, the present invention may be embodied in several different forms, and thus is not limited to embodiments described herein.

Throughout the specification, when a certain portion is "coupled (connected, contacted, or joined)" with another portion, this includes not only "directly coupled" but also "indirectly coupled" with another member interposed therebetween. In addition, when a certain portion "includes" a certain component, this means that other components may be further included, rather than excluding the other components, unless otherwise stated.

The terms used in the present invention are used only to describe specific embodiments and are not intended to limit the present invention. Singular expressions include plural expressions unless the singular expressions clearly indicate otherwise in context. In the present specification, it is to be understood that terms such as "include" or "have" are intended to designate that features, numbers, steps, operations, components, parts, or combinations thereof described in the specification are present and the possibility of the presence or addition of one or more other features, numbers, steps, operations, components, parts, or combinations thereof is not excluded in advance.

Hereinafter, preferred embodiments of the present invention will be described with reference to the accompanying drawings so that persons having ordinary knowledge in the art can easily implement the invention.

As shown in FIGS. 1 to 14, a weld bead inspection device 100 according to an embodiment of the present invention may be configured to include a housing unit 10 that forms an appearance; an imaging unit 50 that images shapes of weld beads in an inner space that is open downward from a middle inner side of the housing unit 10; a control unit 70 that is provided in the housing unit 10 to store image data imaged by the imaging unit 50 or to calculate external shapes of the weld beads for determining welding quality on the basis of the image data.

In the weld bead inspection device to the embodiment of the present invention, the control unit 70 may include a module unit 71, a power management unit 72, a communication control unit 70, and the like. The module unit 71 may be configured to play a role in controlling individual operations of the device, inspecting whether or not the device is properly operated, storing the captured data, and the like. The power management unit 72 may be configured to play a role in transforming and distributing external power or power supplied from an internal battery. The communication control unit 70 may be configured to play a role in controlling internal and external communications of the device.

According to this exemplary basic configuration, the weld bead inspection device 100 corresponding to the embodiment of the present invention may be configured such that the weld bead inspection device is placed on an outer surface of the pipe on which the weld beads are formed with respect to the weld bead created a welding joining part, inspection of the weld beads is started in a state in which the weld beads are aligned so that the weld beads can be located in an imaging region of the imaging unit 50, and the imaging unit 50 continuously or intermittently images the weld beads located in the imaging region when the weld bead inspection device 100 is moved along the weld beads.

In this case, a method of imaging the weld beads with the weld bead inspection device 100 may include a method of performing imaging in the form of a moving image while moving along an outer peripheral surface of the pipe to be measured, a method of performing imaging in the form of a snapshot in a temporarily stopped state or at a predetermined moment during movement, and the like. In addition, in the case of performing imaging in the form of the snapshot, there is a method of performing imaging at a position or time optionally selected by an inspector, in addition to a method of recognizing the positional movement of the device on the outer peripheral surface of the pipe to periodically perform imaging on the basis of the movement distance or movement angle displacement or a method of recognizing the lapse of time to determine that the device has moved after a predetermined set period, to image a corresponding point. As a technical means for recognizing the positional movement of the device, a gyro sensor, an acceleration sensor, or the like provided in the device may be used, which is exemplary and not limited thereto.

In addition, a method of performing imaging by loading a preset imaging method into the device may be used. That is, for example, the preset imaging method may be applied differently depending on the outer diameter of the pipe P. A structure may be configured in which imaging is performed by determining an imaging time point depending on a predetermined movement distance, movement angle, time period, or a combination thereof on the basis of the outer diameter dimension of the pipe P. In this case, it is preferable that a tag is disposed in the form of a sticker or label in the vicinity of the beads B for inspection. Additional information such as pipe material information and welding work information in addition to the outer diameter information of the pipe P is incorporated into the tag. The bead inspection device 100 may be configured to load the information incorporated into the tag with a separate scanner component or an image sensor unit of the imaging unit so that a preset imaging method related to the pipe can be called from an internal storage element or through communication with the outside.

Meanwhile, in a case where the attached tag information of the pipe is erroneously attached, through comparison with a value measured by a sensor that recognizes the position of the above-described device, the present invention has the effect of immediately calibrating the error of the pipe information related to the erroneous attachment to secure verified inspection data.

In addition, the weld bead inspection device 100 can determine the quality of target beads and the quality of an integrated welding joining part by imaging the beads located in the imaging region of the imaging unit 50 in the form of a moving image or a snapshot, storing the captured image data, or calculating information on the appearance of the weld beads such as the size, shape, and color of the weld beads from the image data as data for determining the welding quality, and comparing the calculated information on the appearance of the beads with predetermined inspection standard data. The captured image data, the calculated information on the appearance of the beads, and the information such as the imaging location, time, and quality determination value may be stored in the device together with the pipe information and the welding work information, or may be transmitted to a remote server or local station device through wired or wireless communication.

In addition, as shown in FIG. 1, in the weld bead inspection device 100 of the present invention, the housing unit 10 may be configured to move along outer peripheries of pipes P in a state in which the device of the present invention is mounted at a point where the housing unit 10 can face the beads B created a welding part for joining between the pipes P. That is, it is preferable that a contact portion 19 of the above housing unit 10 has a curved structure in which a central part is concave in order to maintain a state in which the contact portion 19 is mounted in contact with each pipe P, and the curved shape of the contact portion 19 is configured in a shape corresponding to the outer peripheral surface of the pipe P having a predetermined standard size for the inspection of the beads.

Here, the contact portion 19 may be configured to correspond to base parts of both side plates of the housing unit 10 constituting the appearance of the device and include even some of front and rear base surfaces or may be configured to include even a contact plate 13 to be described below.

In this way, a structure brought into close contact with the outer peripheral surface of the target pipe P is formed through the curved shape of the contact portion 19. Accordingly, when the beads (B) to be inspected are imaged, the present invention has the effect that the bead inspection device 100 can maintain a stable posture, and the imaging position of the beads B to be inspected can be aligned with the imaging region of the device.

In addition, as the contact portion 19 of the bead inspection device 100 maintains a close contact state with the outer peripheral surface of the pipe P, the present invention has the effect that incidence of external ambient light into the device can be prevented or reduced, thereby securing the quality of captured image data at an excellent level.

Figure 2A:
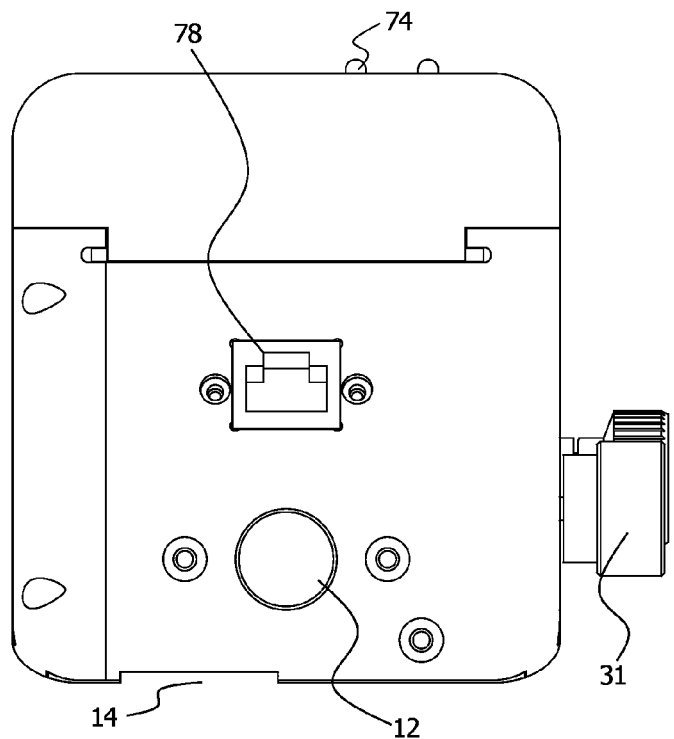
FIGS. 2A and 2B are a left side view and a right side view of an overall external view of the weld bead inspection device according to the embodiment of the present invention.

Meanwhile, specifically describing the additional configuration of the weld bead inspection device 100 of the present invention, as shown in FIG. 2A, the weld bead inspection device 100 of the present invention has a LAN port 78 for communication with the outside on one side surface of the housing unit 10 forming the appearance, and a hook claw 12 for a fixing means for fixing the weld bead inspection device 100 of the present invention may be additionally configured.

Since the LAN port 78 may be configured so that a communication line for communication can be connected to the weld bead inspection device 100, the present invention has the effect that the LAN port 78 allows immediate transmission of the image data captured during the inspection work, and can call data from a server or the outside or receive feedback signals about the work.

In addition, the fixing means may be additionally provided outside the housing unit 10 to prevent the device from coming off when the weld bead inspection device 100 is located at and fixed to the outer periphery of the pipe P to inspect the beads B. The fixing means may include a fixing member such as an elastic band, a flexible band made of leather or cloth, a flexible strap or string, a chain member, or a clamp.

Figure 3:
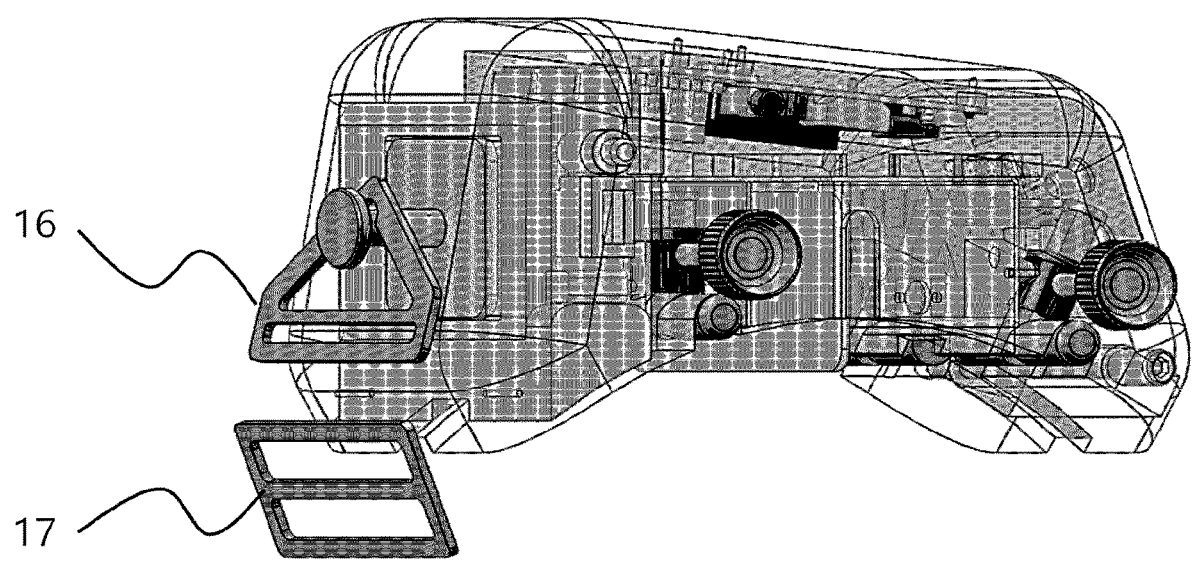
FIG. 3 is an exemplary view showing a buckle and a hook for fixing the weld bead inspection device according to the embodiment of the present invention.

In this case, as an example, as shown in FIG. 3, a hook 16 may be additionally provided on one side of the fixing means. The hook is formed to be fixable to the hook claw 12 but is configured not to come off easily. Accordingly, the present invention has the effect that the fixing means can be firmly fixed regardless of contamination resulting from dust in an inspection environment or foreign substances on the pipe and the weld bead inspection device 100 can be prevented from coming off from the pipe P during movement for the bead inspection work.

Moreover, members such as a buckle 17 capable of adjusting the length may be additionally configured on the fixing means. Accordingly, in a case where a change in length such as deformation or entanglement caused by the tension of the fixing means occurs, the length of the fixing means can be adjusted to match the diameter of the pipe to be inspected. Thus, the present invention has the effect that the fixing means can be firmly fixed to the outer peripheral surface of the pipe.

In addition, the fixing means may be configured such that dimensions such as scales for the diameter of the pipe are marked thereon to adjust the length in accordance with the diameter of the pipe. Accordingly, the inspector has convenience when adjusting the length.

Figure 2B:
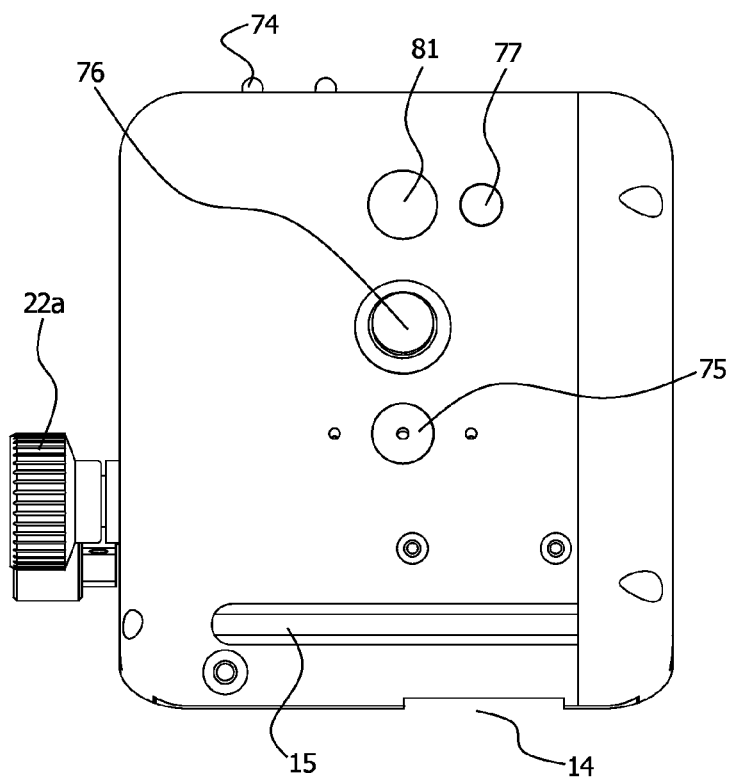

In addition, as shown in FIG. 2B, a control input unit 76 capable of controlling whether or not the device operates, a power connection unit 81 to which power is supplied from the outside, a communication antenna 77 capable of wireless communication with an external device, an alarm unit 75 that sends an alarm for providing information through sound, and a fixing and hanging rod 15 for fastening the above-described fixing means can be further configured on the other outer side surface of the housing unit 10.

In this case, the control input unit 76 may be configured as one or more devices for controlling whether or not the operation of the weld bead inspection device 100 is performed. The control input unit 76 may be configured as an ON/OFF switch, a magnet switch, a touch panel, or the like or may be configured as a unidirectional or bidirectional signal input device.

As an example, in a case where the control input unit 76 is configured as a touch panel or the like, the control input unit 76 may be configured to display information retrieved through the tag, or may be configured to output information such as an inspection preparation state or an inspection completion state of a setting screen and a device for operating the bead inspection method of the device.

Moreover, the power connection unit 81 is for supplying power from the outside. The weld bead inspection device 100 has a rechargeable battery 82 therein. The battery 82 may be detachably formed. The mounting structure of the battery 82 may be configured to be inserted and separated through opening and closing of a battery cover 11 formed at an upper part of the housing unit 10.

Therefore, the battery 82 may be configured to be inserted into the weld bead inspection device 100 in a fully charged state from a separate charger in a separated state. During the initial operation of the weld bead inspection device 100, the weld bead inspection device can be operated with the fully charged battery 82 inserted thereinto. However, in a case where the charged battery 82 is discharged with the operation of the device, the device can be operated by supplying power from the outside through the power connection unit 81.

In this case, the power connection unit 81 is configured so that the power supplied therethrough can charge the battery 82 inserted into the device. Accordingly, when the battery of the device is in a discharged state, the power connection unit 81 may be configured so that the battery 82 can be charged simultaneously with the operation of the device by using the power connection unit 81.

In addition, the communication antenna 77 is for wireless communication of the device and may be provided as a means for transmission of an inspection result of the weld bead inspection device 100, communication from a server, or communication with a portable terminal of the inspector.

That is, in calling the above-described tag information or the like, the weld bead inspection device 100 can read the information of the tag itself but may be configured to be capable of calling other information stored in the server through the attached tag and transmitting an inspection result to the server in real time or transmitting the result to a separate terminal carried by the inspector. Thus, this can help the inspector to determine in real time whether or not the bead inspection device is properly operated.

In this way, as the configuration for communication is additionally provided, the convenience of the inspection work can be improved, and the failure rate of the inspection work can be reduced through real-time feedback. Thus, the present invention has the effect of improving the overall progress speed and quality of the inspection work.

In addition, the alarm unit 75 is for informing the inspector of the operating state, abnormalities, emergency situations, or the like of the device through sound. As an example, when the inspection work of the pipe is started, the state of the device is set to the state for performing the bead inspection through the control input unit 86. When the device is located in place on the beads to be inspected, a sound effect capable of informing the inspector of the preparation state can be transmitted. When the inspector moves the device, the device makes one rotation around the outer diameter of the pipe and completes the imaging of all points to be inspected, a sound effect capable of informing the inspector of the completion state can be transmitted.

In addition, since the alarm unit 75 can inform the inspector of information by transmitting sound effects for the residual battery capacity and communication state of the device and special situations such as the emergency situations, the inspector can conveniently operate the device and has no difficulty in recognizing each situation. Thus, in a case where a special situation occurs, the present invention has the effect that the inspector quickly copes with the situation.

Moreover, in a case where a touch panel is provided as an example of the above-described control input unit 76 for these kinds of alarming, the touch panel is configured so that information on each alarm situation can be visually transmitted to the touch panel. Thus, the present invention has the effect of allowing the inspector to accurately recognize the corresponding situation.

Meanwhile, the fixing and hanging rod 15 is for fixing the other side of the above-described fixing means to the housing unit. In the present invention, the fixing and hanging rod 15 is shown in the form of a long rod, but this is merely one embodiment. The fixing and hanging rod 15 may be configured in any form as long as the structure thereof can firmly fix the fixing means to the outside of the housing unit 10.

Figure 4A:
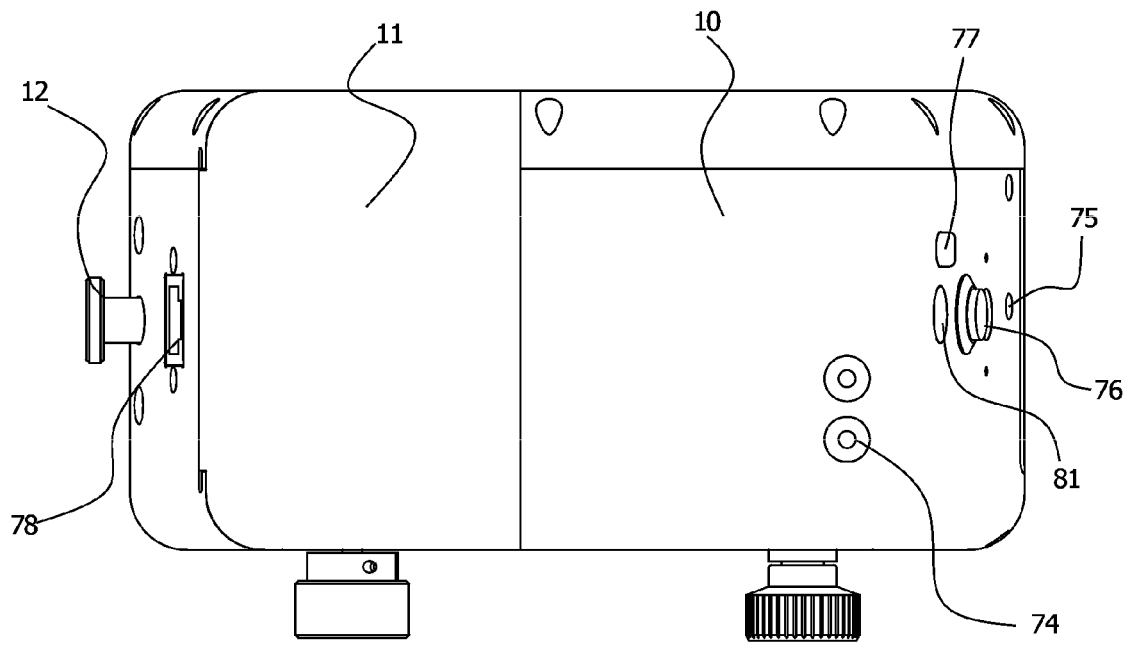
FIGS. 4A and 4B are a plan view and a perspective view of the overall external view of the weld bead inspection device according to the embodiment of the present invention.
Figure 4B:
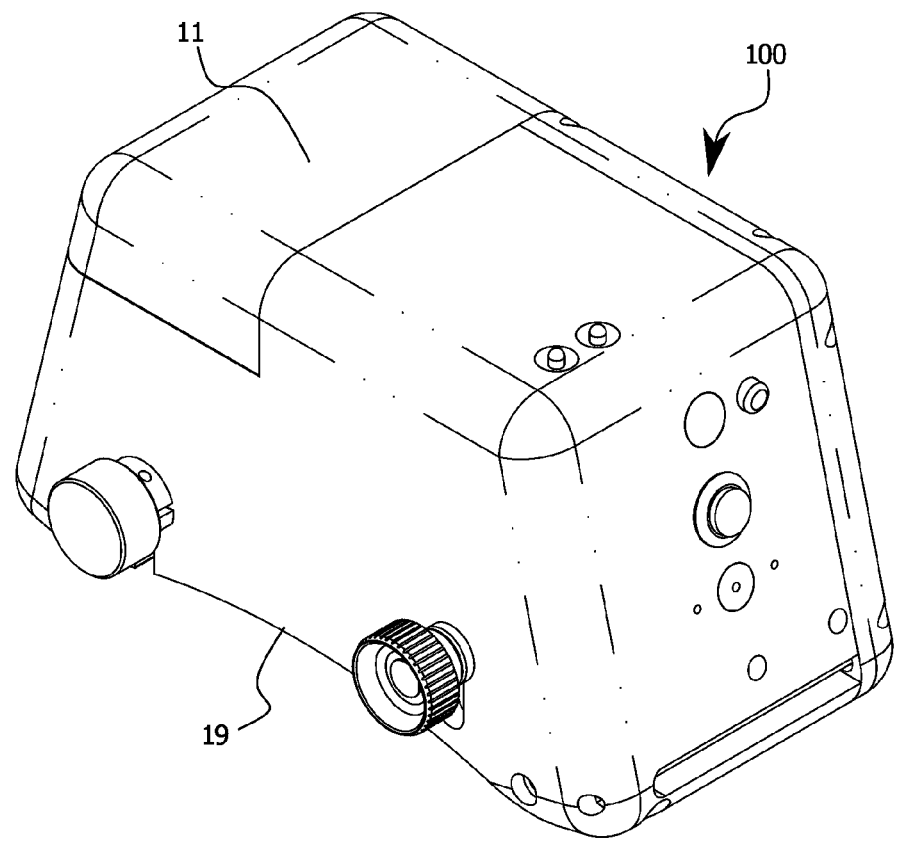

Meanwhile, as shown in FIGS. 4A to 4B, a state indicator light 74 for visually indicating state information such as the operating state of the weld bead inspection device 100 or the residual capacity of the battery 82 may be additionally configured on one side of an upper surface of the housing unit 10, and the battery cover 11 for attaching and detaching the above-described battery 82 may be additionally provided on the other side of the upper surface of the housing unit 10 where the state indicator light 74 is not located.

In this case, the state indicator light 74 may be configured as one or more LED lamps or other light emitting bodies, and the state indicator light 74 has the effect of informing the inspector, who is a user, of the state of the device through separate blinking, illumination, sequential blinking, sequential illumination, or a difference in luminescent color, or the like about the above-described various states of the weld bead inspection device 100.

In addition, in a case where the above-described battery 82 is detachably configured, the battery cover 11 may be formed on the housing unit 10, and the battery cover 11 may be configured to have the same shape as a battery cover of general equipment and to be detachable from the housing unit 10 through a slide method. The battery 82 is configured to be inserted into or separated from the housing unit 10 in a state in which the battery cover 11 is detached from the housing unit 10 through a sliding motion.

In addition, electrodes of the weld bead inspection device 100 for attaching and detaching the battery 82 may be formed inside the housing unit 10 in a state in which the battery cover 11 is detached. Thus, the electrodes of the battery 82 are preferably configured to be inserted toward a corresponding direction. In a case where the battery 82 is integrally formed, the battery cover 11 may not be configured. In this case, it is preferable that the present invention is configured so that the battery 82 can be charged through the above-described power connection unit 81.

Meanwhile, the previous description of the respective components and layout structure provided in the housing unit 10 of the present invention is merely presented as the embodiment and should not be construed as limiting the protection scope of the present invention to the embodiment of the previous description. It is explicitly stated that the inclusion and layout structure of the respective components may be freely selected according to the needs for the functions of the components within a range that does not significantly deviate from the purpose of the present invention.

Figure 5:
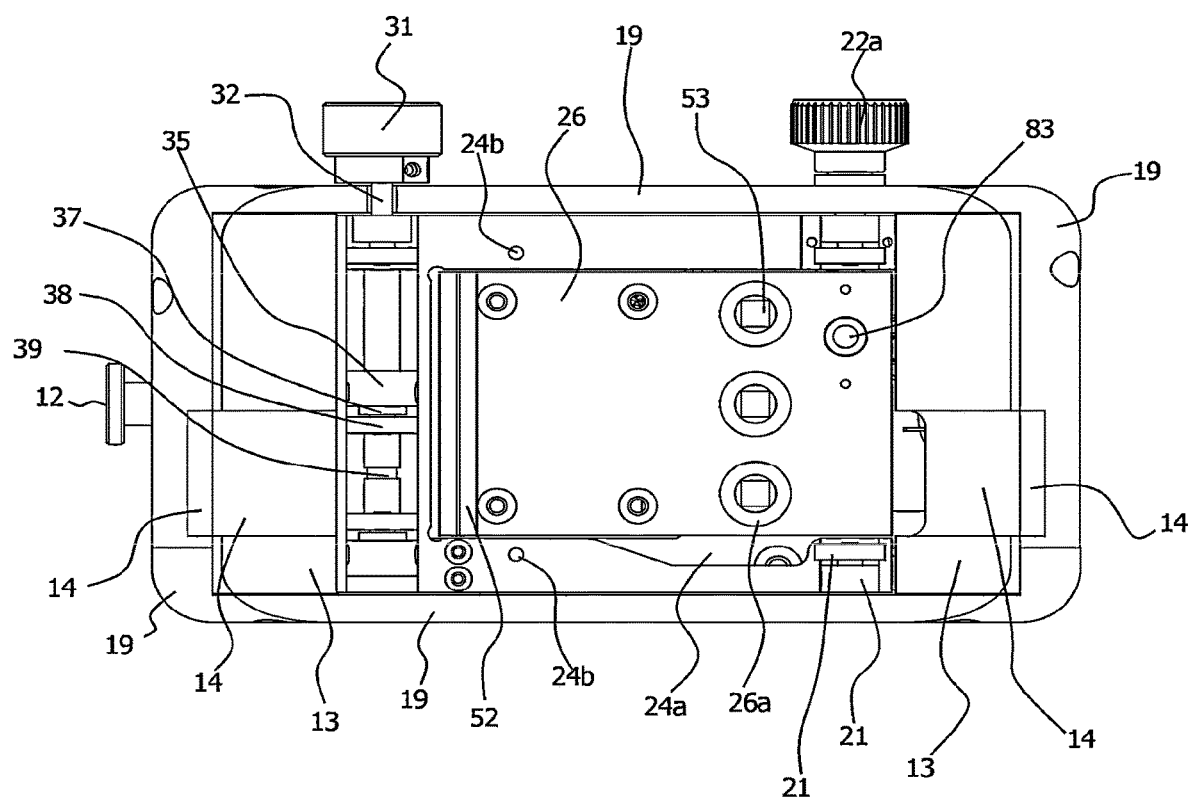
FIG. 5 is a bottom view of the overall external view of the weld bead inspection device according to the embodiment of the present invention.

In addition, a power switch 83 for the operation of the weld bead inspection device 100 of the present invention is not provided on the outer surface of the housing unit 10 but is preferably provided on the inner surface concealed with the housing unit 10. That is, for example, as shown in FIG. 5, the power switch 83 may be formed in a core fixing plate 26 concealed with the housing 10. As the power switch 83 is provided in the core fixing plate 26, the present invention has the effect of preventing the inconvenience that the inspector should proceed with the inspection work from the beginning by accidentally turning off the power of the device during the operation of the device.

Figure 6:
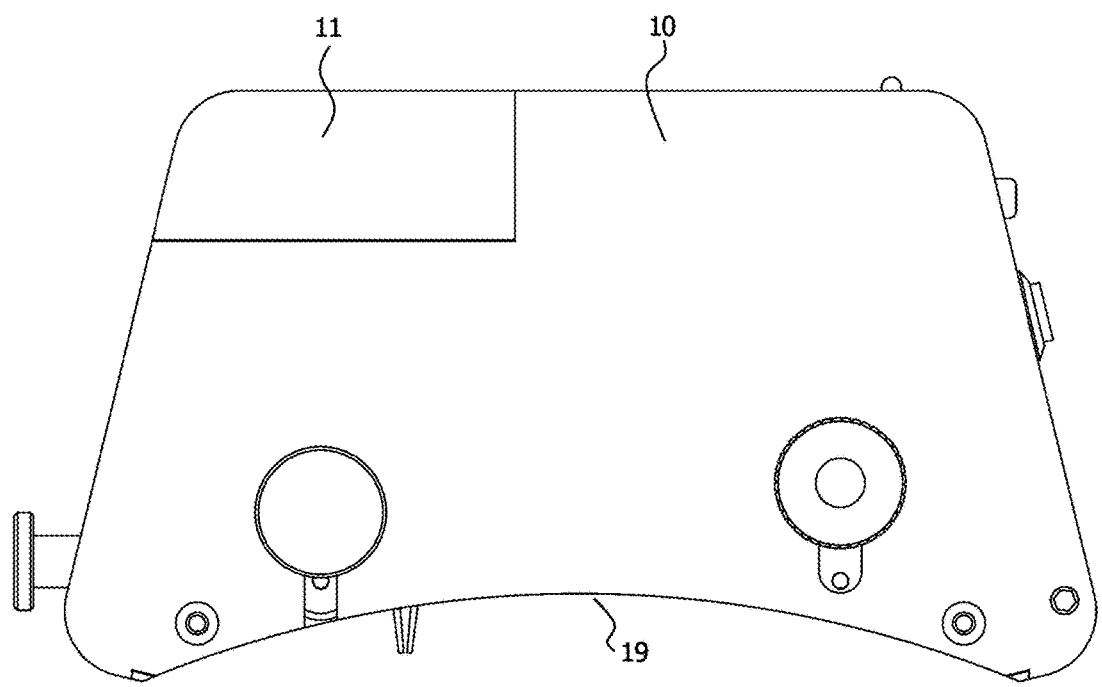
FIGS. 6A and 6B are a front view showing the overall appearance of the weld bead inspection device according to the embodiment of the present invention and a front view excluding a part of a housing unit.
Figure 6:
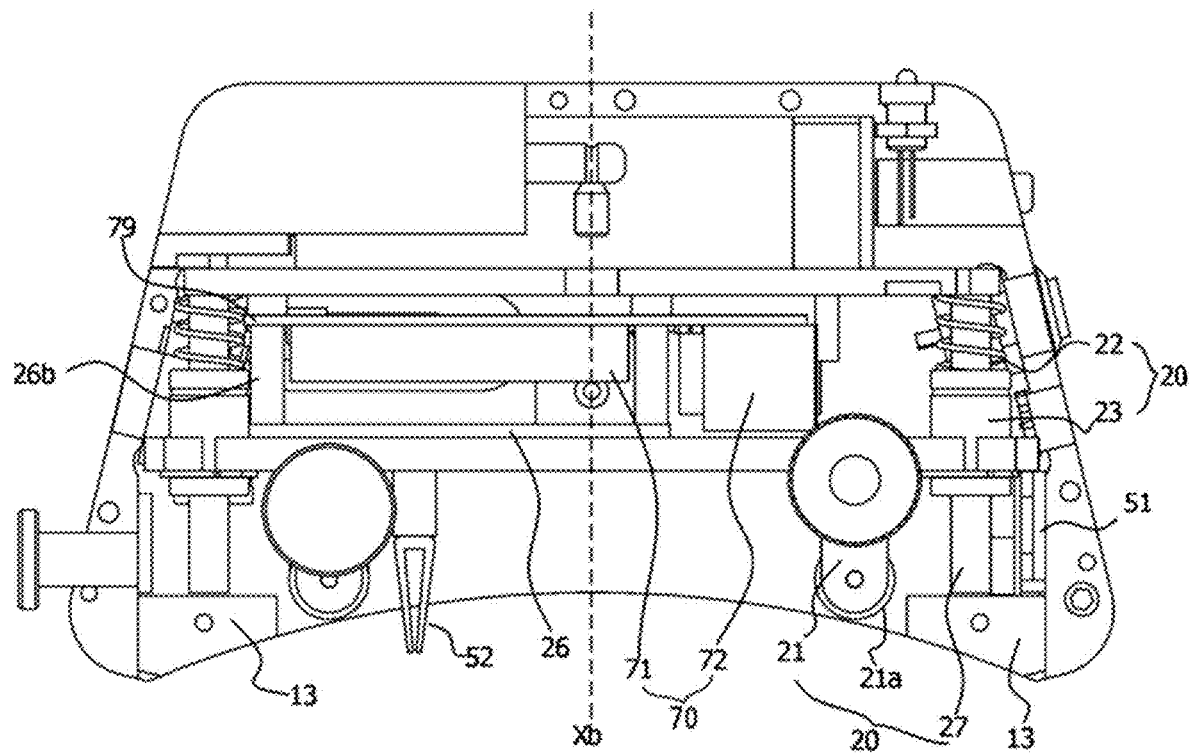

Meanwhile, in the weld bead inspection device 100 according to the embodiment of the present invention, as shown in FIG. 6 and the like, the contact portion 19 of the housing unit 10 is formed in a curved structure so that bead measurement or inspection of the pipe having a predetermined standard size can be performed, and forms a state in close contact with the outer surface of the pipe. The detailed structures of the imaging unit 50 and the like are formed so that the weld bead can be imaged on the inner space concealed with the housing unit 10, the weld bead can be imaged in a tangential direction of the pipe by the image sensor unit 51 of the imaging unit 50, and the weld bead can be imaged at substantially the same position as or at a position very close to a position where a tangential line of the pipe is defined on the basis of a fixed line of sight of the image sensor unit 51. In the following description, for convenience of description, descriptions will be made with the above position as an imaging position Xb for the beads by the image sensor unit 51.

In addition, the contact plate 13 having a bottom surface formed in a curved arc shape connected to the curved arc-shaped contact portion 19 of the housing unit 10 may be additionally provided at an inner lower end part of the housing unit 10. Such a contact plate 13 is configured to easily come into close contact with the outer peripheral surface of the pipe in the inspection work of the weld bead inspection device 100, and is capable of playing a role in supporting the structure and load of the device at both ends of the weld bead inspection device 100, playing a role in blocking the incidence of external ambient light, and the like.

Moreover, it is preferable that a bead groove 14 allowing the beads to pass therethrough is provided on the bottom surface of the contact plate 13 at a point spaced apart from the center of the device. The bead groove 14 has the effect of alignment convenience of the device and the effect of reducing interference or collision with the beads during traveling by aligning the position of the bead groove 14 with the beads (B) when the inspection work of the weld bead inspection device 100 for the pipe P is performed.

In addition, the weld bead inspection device 100 according to the embodiment of the present invention may be configured to be capable of traveling along the outer peripheral surface of the pipe in a posture where the weld beads to be imaged are located to be biased in a lateral direction of the housing unit 10. That is, the bead groove 14 of the housing unit 10, the image sensor unit 51 of the imaging unit 50, and the like are configured to be located at a point biased in the lateral direction rather than the center of the device. Accordingly, the weld bead inspection device 100 can be aligned in a posture where the weld bead inspection device 100 is biased to one side with respect to the beads B in performing the inspection work. Thus, the present invention can be configured so that the need for securing an opposite space for imaging the beads is not great.

Due to this, for example, even in a situation where a curved shape such as an elbow is joined to an end part of the pipe and it is difficult to secure a space around the beads, there is a convenience that the weld bead inspection device 100 can image the beads without much difficulty.

In addition, the weld bead inspection device 100 according to the embodiment of the present invention may be configured to further include a withdrawal supporting unit 20 as an additional technical means that is configured for a pipe having a predetermined standard size and is capable of smoothly performing bead inspection by the device even in a case where the size of the pipe is changed.

The withdrawal supporting unit 20 may be configured to include one or more supporting block 21 that is withdrawn from the inside of the housing unit 10 and is supported on the outer surface of the pipe having the changed dimension so that a stable imaging posture of the device can be secured corresponding to the pipe having the changed dimension, and a fixing knob 22a that temporarily fixes the supporting block 21 in a state in which the supporting block 21 is withdrawn to such a length that the fixing knob 22a comes into contact with the outer surface of the pipe.

In addition, it is preferable that the supporting blocks 21 are located below both ends of the weld bead inspection device 100 of the present invention so that the imaging position Xb for the beads can be maintained despite the change in pipe dimension.

The withdrawal supporting unit 20 includes a plurality of the supporting blocks 21. It is preferable in terms of improving the structural rigidity of the device, simplifying the structure, and the like that, as in an example shown in FIGS. 5 and 6, the plurality of supporting blocks 21 are connected to and integrated with each other at an upper end part of the withdrawal supporting unit 20 or are connected to each other and formed into an integrated structure at a lower end part of the withdrawal supporting unit 20 as in an embodiment shown in FIG. 7. Accordingly, the withdrawal operations of the supporting blocks are synchronized with each other and fixed together with one fixing knob 22a.

Figures 10A, 10B:
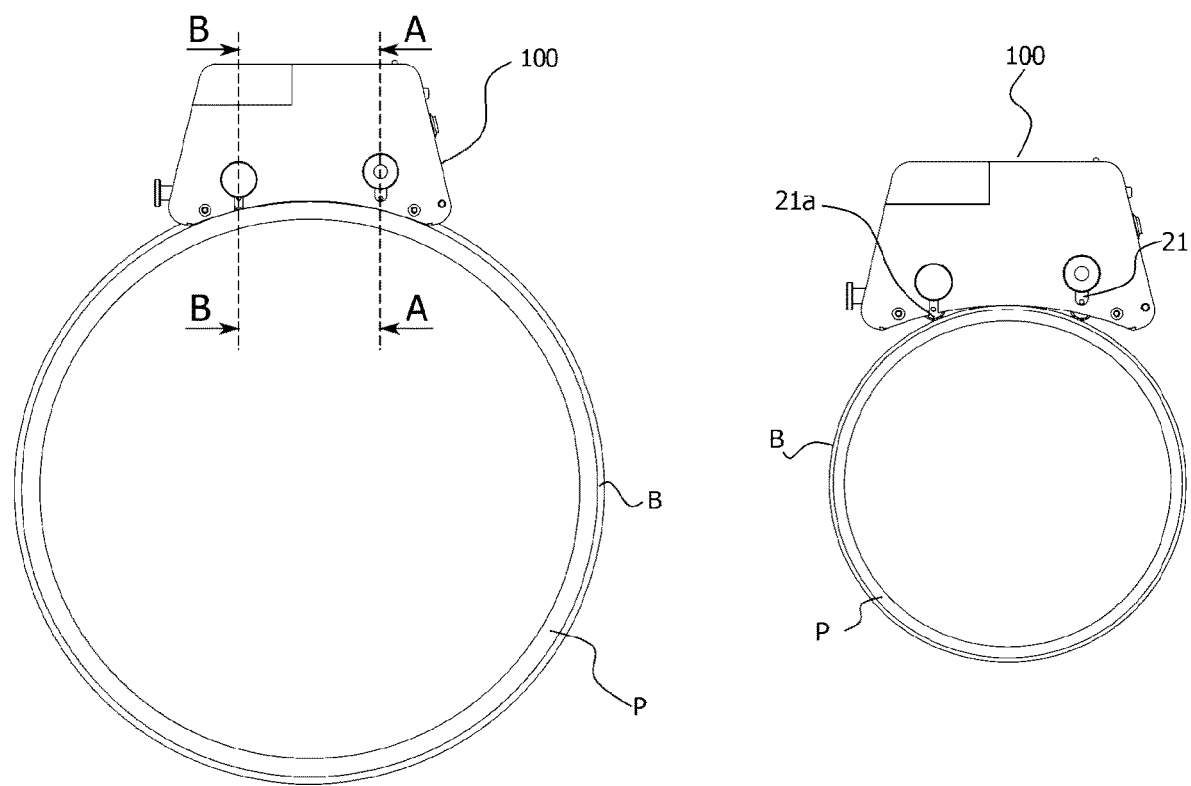
FIGS. 10A and 10B show an example of use according to various pipe sizes of the weld bead inspection device according to the embodiment of the present invention.

In a case where the device is located on the outer peripheral surface of the pipe P in order to perform the inspection of the beads B formed on the outer peripheral surface of the pipe P by using the weld bead inspection device 100, as exemplarily shown in FIG. 10, the bottom surface of each supporting block 21 is temporarily fixed in a state in which the supporting blocks are located in contact with the outer peripheral surface of the pipe P. When the inspector moves the weld bead inspection device 100 in this position to rotate the weld bead inspection device 10 along the outer peripheral surface of the pipe P as previously described, the supporting block 21 slides on the outer peripheral surface of the pipe while supporting the housing unit 10 in a stable posture on the outer peripheral surface of the pipe. Moreover, the beads B to be inspected are imaged.

Moreover, a component such as the rolling wheel 21a may be additionally provided on a bottom portion of the supporting block 21, that is, the part thereof in contact with the pipe so that the traveling resistance and pipe surface damage caused by a frictional action between the supporting block 21 and the outer peripheral surface of the pipe P can be improved.

Figure 7:
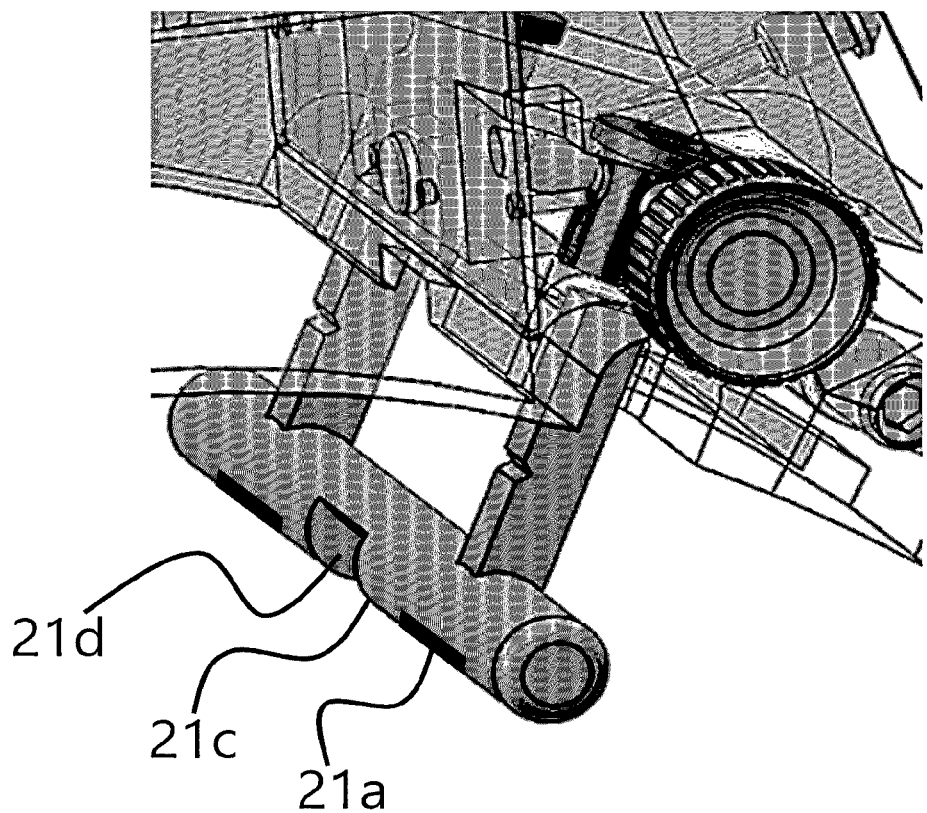
FIG. 7 is a detailed view of a withdrawal supporting unit of a weld bead inspection device according to another embodiment of the present invention.

Meanwhile, the above-described layout structure of the supporting blocks 21 corresponds to the embodiment of the present invention, and as another embodiment, as shown in FIG. 7, a pair of support structures 21c similar to a bar or tube shape crossing both sides of the device may be formed at the lower end of the weld bead inspection device 100.

In addition, a wheel 21a for traveling may be additionally formed in each support structure 21c. The bead groove 14 of the housing unit 10 previously described, and a traveling groove 21d through which the beads B can pass without any interference during the traveling may be formed at positions corresponding to the bead groove 14 of the contact plate 13, and the like, on the pair of support structures 21c.

Meanwhile, the weld bead inspection device 100 according to an embodiment of the present invention further include a component capable of transmitting power for rotation to the rolling wheel 21a of the supporting block 21. As the weld bead inspection device 100 moves along the outer peripheral surface of the pipe P, the rolling wheel 21a may be configured to travel automatically or semi-automatically by operating a switch for providing a separate driving force such as an operation switch rather than being manually moved by the inspector. In this case, the present invention may be configured to guide the inspector that the inspection work has been completed through the units of the aforementioned alarm unit 75, state indicator light 74, and control input unit 76 after having automatically or semi-automatically moved along the outer peripheral surface of the pipe once.

In addition, the withdrawal supporting unit 20 may be configured to be capable of being withdrawn by adjusting the withdrawal height of the supporting block 21.

Describing a detailed structure as the embodiment of the present invention, the supporting blocks 21 constituting the withdrawal supporting unit 20 may be formed such that the supporting blocks 21 are withdrawn to the outside of the housing unit 10 beyond the contact portion 19, and may be formed such that the supporting blocks 21 are fixed to the bottom plate 24 forming a frame of the device and the plurality of supporting blocks are withdrawn together.

In this case, one or more holes may be formed on one side and the other side of the bottom plate 24, and a side surface of the hole may be formed in a torn shape like an elongated hole. Thus, a fastening structure in the form of a clamp capable of adjusting the inner diameter of the hole can be formed by forming a bolt coupling structure capable of adjusting the width of the elongated part of the hole.

Therefore, a suspension slider 23 may be additionally provided in each of the holes in which the clamp fastening structure is formed, and the suspension slider 23 may be formed integrally with the bottom plate 24 by virtue of the clamp fastening structure.

In more detail, referring to a bar shown in FIG. 13B, a suspension pole 27 may be configured such that the suspension pole 27 penetrates a central part of the suspension slider 23. A spring type suspension 22 allowing the suspension pole 27 to be inserted thereinto and having an outer diameter smaller than that of the suspension slider 23 may be located at a point of the upper part of the suspension pole 27 that penetrates the suspension slider 23. A top plate 25 may be configured to be fixed to the housing unit 10 at the upper part of the suspension 22.

Therefore, the suspension 22 may serve as an elastic support that is compressed or expanded between an upper part of the suspension slider 23 and a lower part of the top plate 25.

Meanwhile, a lower end part of the suspension pole 27 may be configured such that the lower end part is combined with or matched with an upper part of the contact plate 13. Thus, the contact plate 13 may be configured to be located at a lower position of the bottom plate 24 provided with the suspension pole 27.

Therefore, as shown in FIG. 13B and the like, the bottom plate 24 may be configured to be movable in the vertical direction of the device along the suspension pole 27, and the supporting blocks 21 fixed to the bottom plate 24 may be configured to move together with the bottom plate 24.

By virtue of this structure, the supporting blocks 21 may be configured to protrude below a lower end of the contact portion 19 corresponding to the base surface of the housing unit 10, and the positions of the supporting blocks 21 moved in the vertical direction may be temporarily fixed through the operation of the fixing knob 22a that may be formed on one side surface of the frame to which the supporting blocks 21 are fastened.

Figure 11:
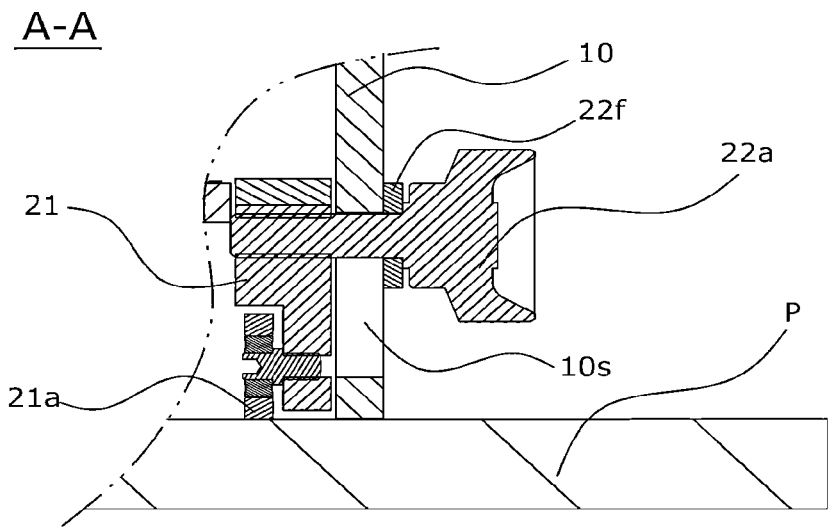
FIG. 11 shows a structure in which a fixing knob of the weld bead inspection device according to the embodiment of the present invention is operated.

More specifically, as shown in FIG. 11, the fixing knob 22a may be configured to temporarily limit the vertical movement of the bottom plate 24 or the supporting block 21 such that the fixing knob 22a comes into contact with and press an outer surface of a front part of the housing unit 10.

That is, for example, in a case where the fixed knob 22a is rotated in one direction in a state in which a central rotary shaft of the fixed knob 22a is fixed to the supporting block 21 by a screw connection structure, a rear surface part of the fixing knob 22a does not come into contact with the outer surface of the front part of the housing unit 10, and the bottom plate 24 is freely movable in the vertical direction along the suspension pole 27.

Contrary to this, in a case where the fixing knob 22a is rotated in the opposite direction, the rear surface part of the fixing knob 22a presses the outer surface of the front part of the housing 10 and is temporarily fixed by a frictional force. Accordingly, the supporting block 21 rotatably connected to the fixing knob 22a and the bottom plate 24 to which the supporting block 21 is fixed are not movable up and down.

In this case, it is preferable that a rubber or similar friction member 22f for increasing the frictional force is additionally provided at the rear surface part of the fixing knob 22a in contact with the outer surface of the front part of the housing unit 10.

Figure 8:
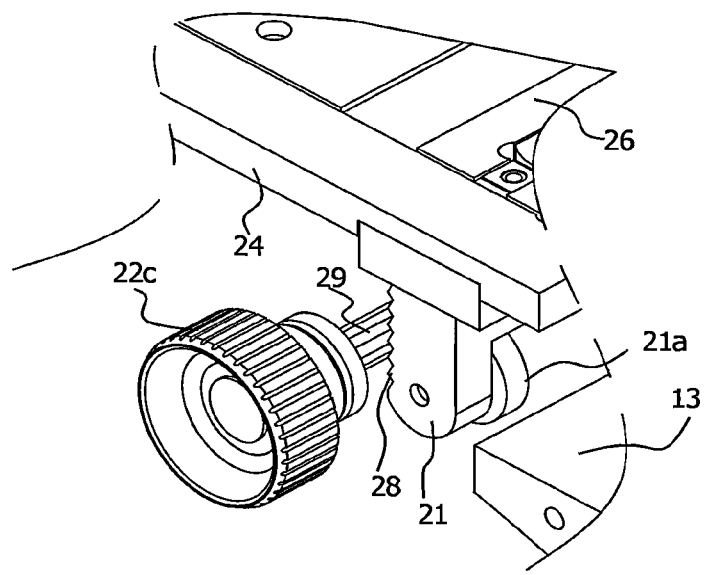
FIG. 8 is a detailed view of a height adjustment structure of a withdrawal supporting unit of a weld bead inspection device according to a still further embodiment of the present invention.

Meanwhile, as still another embodiment of the present invention, as shown in FIG. 8, a pinion gear 29 may be formed on the operating knob 22c, and a rack gear 28 may be formed on one side of the supporting block 21. Thus, the height of the supporting blocks 21 can be adjusted by rotationally operating the operating knob 22c using the vertical movement principle of the rack gear 28 through the rotation of the pinion gear 29.

Figure 9:
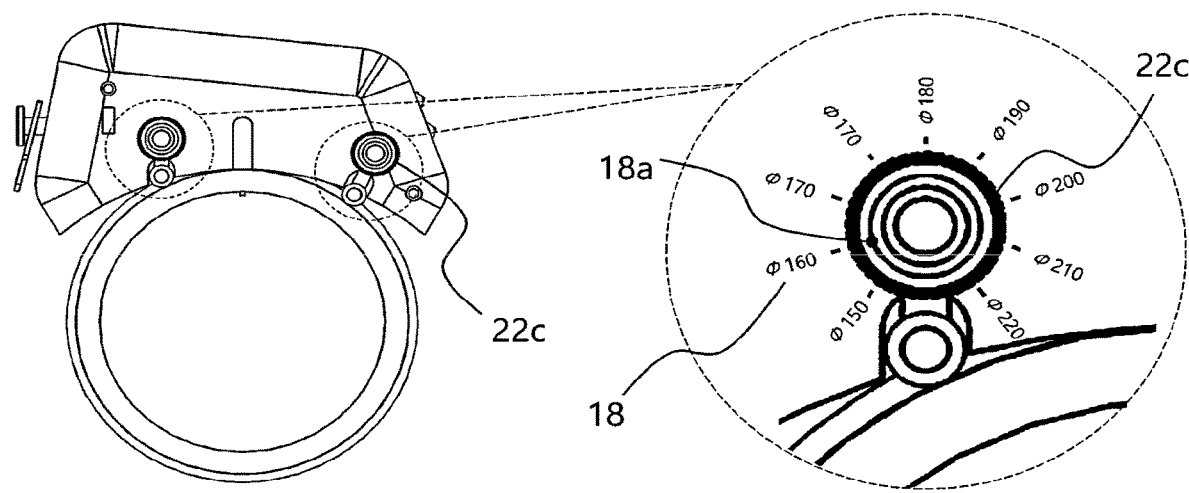
FIG. 9 is a detailed view of a detailed structure of an operating knob for adjusting the height of a withdrawal supporting unit of a weld bead inspection device according to a still further embodiment of the present invention.

Moreover, as shown in FIG. 9, a scale indicator 18, a reference point 18a, and the like may be additionally provided on or around the operating knob 22c to indicate a pipe size corresponding to the extension of the supporting block 21. Accordingly, the present invention has the effect of improving the convenience for the inspector to set a required amount of withdrawal according to the size of the pipe.

Figure 12:
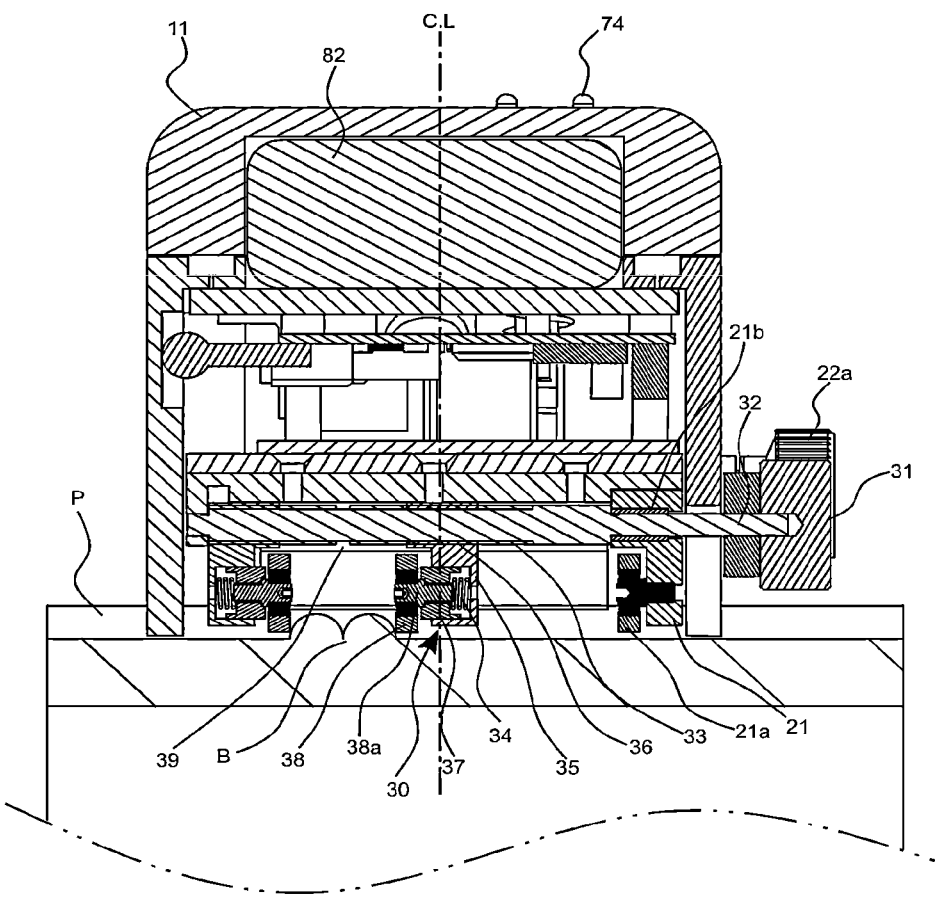
FIG. 12 is a sectional view of a bead tracking guide part of the weld bead inspection device according to the embodiment of the present invention.

In addition, the weld bead inspection device 100 according to the embodiment of the present invention may be configured to include a bead tracking guide part 30 that performs guiding so as to travel along the weld beads when the weld bead inspection device is made to travel on the outer surface of the pipe. That is, as shown in FIG. 12, the bead tracking guide part 30 is configured to perform guiding so that the beads B to be inspected are within the imaging region in performing the inspection of the beads B formed on the outer peripheral surface of the pipe P with the weld bead inspection device 100 of the present invention.

When a detailed structure for the movement of such a bead tracking guide part 30 is described in accordance with the embodiment of the present invention, a guide knob 31 may be provided on the outer shape of the housing unit 10, the guide knob 31 may be coupled to a knob shaft 32 disposed inwardly through the housing unit 10, and a knob thread 33 may be formed on an outer peripheral surface of the knob shaft 32.

Meanwhile, the bead tracking guide part 30 may be provided with a guide bracket 35, the guide bracket 35 may be configured in the form of a rectangular column, a guide thread 36 that can be screwed with the knob thread 33 may be configured at a lower part of the guide bracket 35 such that the guide thread 36 penetrates a side surface of the guide bracket 35, and a bead facing part 38 capable of coming into contact with side surfaces of the beads (B) on one side may be provided at a lower part of the guide bracket 35.

When the bead tracking guide part 30 is formed such that the guide bracket 35 is fastened to the knob shaft 32, the knob shaft 32 rotates depending on the rotational operation of the guide knob 31. According to the structure of the guide thread 36 screwed with the knob thread 33, it is natural that the guide bracket 35 rotates in a rotational direction of the knob shaft 32. However, an upper surface of the guide bracket 35 is formed at right angles so that the upper surface comes into contact with a bottom surface of the bottom plate 24 such that the rotation thereof is hindered. Accordingly, the guide bracket 35 may be configured to be movable such that the position thereof on the knob shaft 32 moves forward or backward, without rotating together with the rotation of the knob shaft 32. Thus, the position of the bead tracking guide part 30 can be adjusted by rotationally operating the guide knob 31.

Meanwhile, as a still further embodiment of the present invention, it is preferable that the supporting block 21 is configured to be located only on one side surface of the device, not configured as a pair of parallel structures at a point where the bead tracking guide part 30 is formed. Another bead tracking guide part 30 may be additionally configured on the other side surface where the supporting block 21 is not provided.

In this case, the guide threads 36 of the guide brackets 35 of the plurality of bead tracking guide parts 30 may be configured to be formed as left and right threads, respectively. Thus, in the case of the bead tracking guide parts 30 configured in a pair, an operating structure can be achieved in which that the guide knob 31 moves closer to or away from a bead alignment part 39 formed on the knob shaft 32.

In addition, in a coupling structure with the guide bracket 35, a structure of a buffer block 37 and a guide spring 34 may be additionally provided on the bead facing part 38 provided on the guide bracket 35.

More specifically, a groove into which the buffer block 37 can be inserted is formed at a lower end of the guide bracket 35, the guide spring 34 is provided between the guide bracket 35 and the buffer block 37. The buffer block 37 is preferably configured as a fastening structure that does not come off from the guide bracket 35 by the elastic force of the guide spring 34.

In this case, the bead facing part 38 may be configured to be fastened to a side surface of the buffer block 37 that is not inserted into the guide bracket 35. More preferably, the bead facing part 38 may be configured in the form of a disc, and may be configured such that a facing part fastening shaft 38*a* passes through a central part of the bead facing part 38 and the penetrating portion is fastened to be inserted into the buffer block 37.

Therefore, the bead facing part 38 may be configured in the form of a wheel that rotates around the facing part fastening shaft 38*a*, and a lateral elastic support structure may also be provided by the guide spring 34 that supports a portion between the buffer block 37 and the guide bracket 35.

Therefore, in a case where the bead tracking guide part 30 is configured in a pair and configured to press both side surfaces of the beads to be inspected, even when the beads are bent in a non-uniform shape or are formed in shapes having different thicknesses in the process of inspecting the beads, the bead facing part 38 can maintain such a shape that the bead tracking guide part 38 presses both side surfaces of the beads through the above-described lateral elastic support structure.

Therefore, it is preferable that a bead imaging camera provided in the weld bead inspection device 100 is provided with the bead tracking guide part and is located above a space provided for the inspection beads to pass by. Accordingly, the present invention has the effect that the beads can be imaged in a certain composition without shaking or distortion in imaging the beads.

In addition, it is preferable that a point where a zone is created in which the beads are moved through the bead tracking guide part 30 is the same as the position of the aforementioned bead groove 14.

Moreover, as described above, it is preferable that the rolling wheel 21*a* may be additionally configured on the bottom surface of the supporting block 21. Since the bead tracking guide part 30 also functions as the supporting block 21, the bead tracking guide part 30 can be considered for the layout of the entire supporting blocks.

Meanwhile, in the weld bead inspection device 100 according to the embodiment of the present invention, the imaging unit 50 may be configured to include the image sensor unit 51 for imaging beads at a front lower end of the device; a background member 52 serving as a background when the image sensor unit 51 images the beads at a rear lower end of the device; and an illumination unit 53 located between the image sensor unit 51 and the background member 52 to adjust brightness when imaging the beads.

Figure 13:
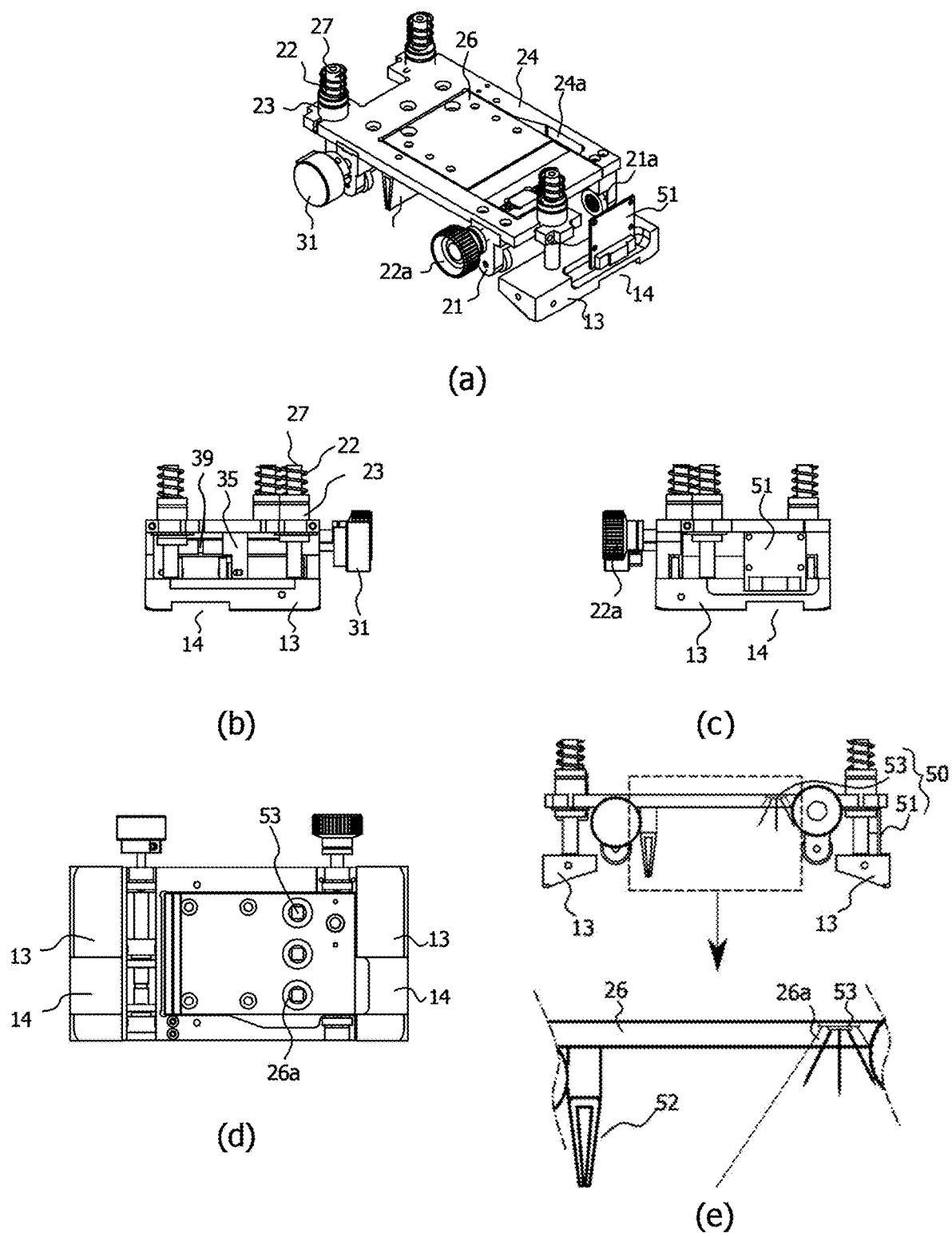
FIGS. 13A to 13E are detailed views of a layout structure of an imaging unit and the withdrawal supporting unit in the weld bead inspection device according to the embodiment of the present invention.

Exemplary detailed structures of the imaging unit 50 and the like can be grasped from FIGS. 5, 6, and 13, and the like. Among these figures, FIGS. 13A to 13E are perspective views of a detailed structure of the layout structure of the imaging unit, the withdrawal supporting unit, and the like in the weld bead inspection device of the present invention, FIG. 13A is a perspective view, FIG. 13B is a left view, FIG. 13C is a right view, FIG. 13D is a bottom view, and FIG. 13E is a front view and a partially enlarged view.

In more detail with respect to the imaging unit 50, the image sensor unit 51 may be provided at a front lower end corresponding to a traveling direction for imaging during the operation of the weld bead inspection device 100 in a downward open space at a lower end of the housing unit 10 constituting the weld bead inspection device 100 of the present invention so as to face a direction opposite to the traveling direction. The focus of the image sensor unit 51 may be set on the basis of a position passing through the imaging position Xb at the contact portion 19. The background member 52 forming a background in the image may be additionally provided on an opposite side facing the image sensor unit 51.

In addition, the illumination unit 53 may be additionally provided between the imaging position Xb and the image sensor unit 51 to adjust the brightness for the beads to be imaged. In the present invention, the illumination unit 53 is configured to be disposed at a lower part of the above core fixing plate 26.

In addition, at least a lower end portion of the background member 52 may be made of a soft material. Thus, in a case where the weld bead inspection device 100 of the present invention is moved in performing the inspection of the beads, the background member 52 is located behind the device and comes into contact with the beads to be inspected in an inclined manner behind the imaging position (Xb). Accordingly, the present invention has the effect of blocking and shielding the external incidence light of the housing unit 10 that is incident from the rear side.

Therefore, since light does not enter from the outside at that point, and the shielded state is maintained, the condition that no light continuously enters during the inspection of the beads is maintained. Thus, the present invention has the effect of maintaining the uniform imaging quality.

That is, in imaging a line of beads or all beads formed for joining pipes, only the light of the illumination unit 53 included in the imaging unit 50 without the light incident from the outside from the beginning to the end is provided as a light source for imaging. Accordingly, since the same light source is used as a whole when imaging the beads, the present invention has the effect that a change in light incident from the outside and variables of the imaged result are reduced.

In addition, the illumination unit 53 providing the light source may be configured to be located between a high point of each bead imaged at the imaging position (Xb) and the image sensor unit 51 for imaging such that a light source is provided in front of the bead imaged based on the imaging position, and may be configured so that the beads can be imaged by providing a light source in such a manner that a front part of the pipe is brightly illuminated on the basis of the high point of the bead at the imaging position, a boundary line can be formed on the basis of the high point of the bead due to the illumination, and the shape of the bead as the imaged result can be converted into digital data.

In this case, the position where the light source of the illumination unit 53 is provided may be configured such that the imaging position (Xb) is located on the background member 52 side. However, in this case, an image of the beads captured through the image sensor unit 51 may be captured such that a front part of each bead is shaded. As a result, it may be difficult to track the outer shapes of the beads in the imaged result. Thus, it is preferable that the illumination unit 53 is configured to provide illumination toward the beads at a position in front of the imaging position Xb as described above.

In addition, the background member 52 may be configured in a replaceable structure. Thus, in the continuous imaging of the weld bead inspection device of the present invention, in a case where elasticity is lost in a portion made of the soft material, or in a case where damage such as wear or tear occurs, the background member 52 is formed to be easily replaceable, this can help improve the maintainability of the device and the uniformity of the inspection quality.

In addition, the illumination unit 53 may be configured to directly or indirectly provide a light source to the weld beads B, and may be configured to provide illumination under the control of the inspector.

In this case, the light source provided by the illumination unit 53 may be provided as a single visible light configured as any one of various light sources such as white, red, blue, and green light sources, but combined light of the presented light sources may be configured to be provided as a light source.

In the beads, which are a target to be imaged, the above configuration can be provided for the purpose of maintaining uniform quality of the beads to be imaged by providing an appropriate light source depending on the material or color of the pipe because the color of the weld beads may vary depending on the color of the pipe.

Moreover, as shown in FIG. 13E, the illumination groove 26a of the core fixing plate 26 provided with the illumination unit 53 may be configured as a countersink type groove. As the illumination unit 53 is located at an upper end part of the illumination groove 26a, the illumination unit 53 may be formed such that only a necessary portion is irradiated with the light emitted from the illumination unit 53 in imaging the beads to be inspected.

In addition, the imaging unit 50 may be configured to further include a calibration member 54 having standard scales or patterns for comparing and contrasting the sizes of the imaged beads with each other.

Figure 14A:
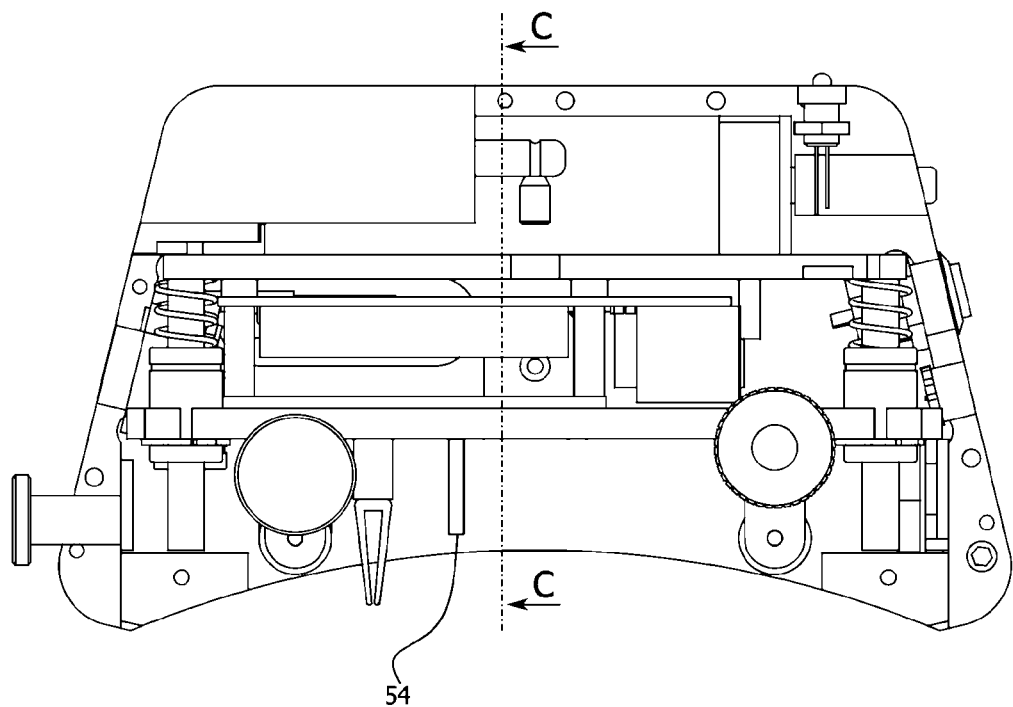
FIGS. 14A and 14B are exemplary views of a detailed structure of a calibration member of the weld bead inspection device according to the embodiment of the present invention.
Figure 14B:
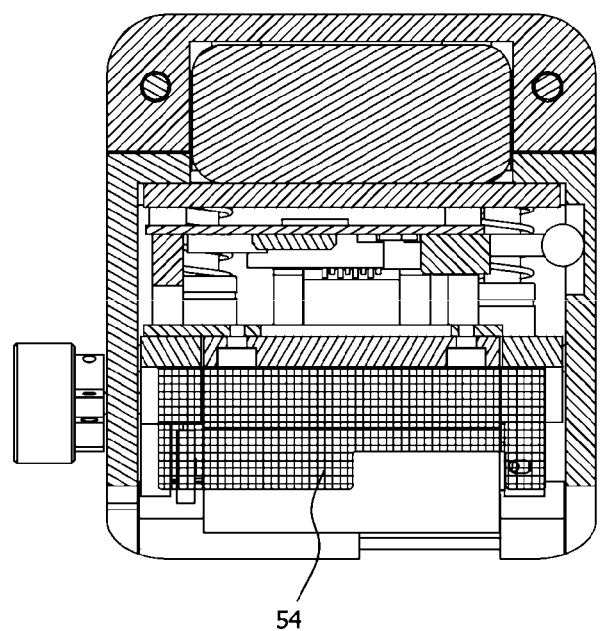

Moreover, as shown in FIGS. 14A and 14B, the calibration member 54 may be configured in a detachable manner in which a calibration member fastening groove 24b formed on a bottom surface of the bottom plate 24 is fastened, and may also be configured in a fixed manner in front of the background member 52. In order to simplify the computational processing work for calculating the bead shape, it is preferable to attach and use the background member 52 only during correction and to perform imaging in a state in which the background member 53 is removed when traveling along the outer peripheral surface of the pipe.

In addition, a groove similar to the bead groove 14 may be formed at a lower end of the calibration member 54 at a point on the same line as a point where the bead groove 14 formed at a point corresponding to the contact portion 19 between the contact plate 13 and the housing unit 10 is formed. Thus, the calibration member 54 may be configured so that the operation of the device is not hindered even when the calibration member 54 is integrally formed. In addition, the material of the calibration member 54 may be formed of a transparent or translucent material.

In addition to this, the description of the present invention described above is for illustrative purpose only, and persons having ordinary knowledge in the art to which the present invention pertains will be able to understand that the present invention can be easily modified into other specific forms without changing the technical spirit or essential features of the present invention. Therefore, it should be understood that the embodiments described above are merely illustrative in all respects and not restrictive. For example, each component described as a single type may be implemented in a distributed or divided form, and similarly, components described in distributed or divided forms may also be implemented in a combined form within the scope understood by persons having ordinary skill in the art. In addition, the steps of the method may be implemented separately multiple times or may be implemented multiple times in combination with at least any other step.

The scope of the present invention is indicated by the following claims, and all changed or modified forms derived from the meaning and scope of the claims and their equivalents should be construed as being included in the scope of the present invention.

EXPLANATION OF REFERENCE NUMERALS

100: WELD BEAD INSPECTION DEVICE
10: HOUSING UNIT
11: BATTERY COVER
12: HOOK CLAW
13: CONTACT PLATE
14: BEAD GROOVE
15: FIXING AND HANGING ROD
16: HOOK
17: BUCKLE
18: SCALE INDICATOR
18a: REFERENCE POINT
20: WITHDRAWAL SUPPORTING UNIT
21: SUPPORTING BLOCK
21a: ROLLING WHEEL
21b: BUSHING
21c: SUPPORTING STRUCTURE
21d: TRAVELING GROOVE
22: SUSPENSION
22a: FIXING KNOB
22b: KNOB REFERENCE POINT
22c: OPERATING KNOB
23: SUSPENSION SLIDER
24: BOTTOM PLATE
24a: WIRING GROOVE
24b: CALIBRATION MEMBER FASTENING GROOVE
25: TOP PLATE
26: CORE FIXING PLATE
26A: ILLUMINATION GROOVE
26b: CORE FIXING STAND
27: SUSPENSION POLE
28: RACK GEAR
30: BEAD TRACKING GUIDE PART
31: GUIDE KNOB
32: KNOB SHAFT
33: KNOB THREAD
34: GUIDE SPRING
35: GUIDE BRACKET
36: GUIDE THREAD
37: BUFFER BLOCK
38: BEAD FACING PART
39: BEAD ALIGNMENT PART
50: IMAGING UNIT
51: IMAGE SENSOR UNIT
52: BACKGROUND MEMBER
53: ILLUMINATION UNIT
54: CALIBRATION MEMBER
70: CONTROL UNIT
71: MODULE UNIT
72: POWER MANAGEMENT UNIT
73: COMMUNICATION CONTROL UNIT
74: STATE INDICATOR LIGHT
75: ALARM UNIT
76: CONTROL INPUT UNIT
77: COMMUNICATION ANTENNA
78: LAN PORT
79: SUBSTRATE
80: POWER UNIT
81: POWER CONNECTION UNIT
82: BATTERY
83: POWER SWITCH
B: BEAD
P: PIPE

The invention claimed is:

1. A weld bead inspection device that inspects weld beads on an outer surface of a pipe, the weld bead inspection device comprising
   a housing unit (10) that forms an appearance;
   an imaging unit (50) that images shapes of the weld beads in an inner space that is open downward from a middle inner side of the housing unit (10);
   a control unit (70) that is provided in the housing unit (10) to store image data captured by the imaging unit (50) or to calculate external shapes of the weld beads for determining welding quality using the image data, and
   wherein the imaging unit (50) is configured such that the imaging unit (50) images appearances of the weld beads in a tangential direction of the pipe,
   wherein the imaging unit (50) includes an image sensor unit (51) that measures an image of the appearances of the weld beads in the tangential direction of the pipe; and an illumination unit (53) that provides illumination for measuring the image,
   wherein the illumination unit (53) sets a direction or range of the illumination such that an opposite side facing the image sensor unit (51) has a dark background, and
   wherein the imaging unit (50) further includes a background member (52) on the opposite side facing the image sensor unit (51), which forms a background in the image.

2. The weld bead inspection device according to claim 1, wherein the background member (52) is formed to have a length longer than such a length that the background member comes into contact with an outer surface of the pipe, and at least a portion of the background member (52) coming into contact with the outer surface of the pipe is formed of a flexible material such that incidence of light from the outside of the housing unit (10) is blocked.

3. The weld bead inspection device according to claim 1, wherein the imaging unit (50) further includes a calibration member (54) provided with a scale or a pattern such that actual external dimensions of the weld beads are capable of being recognized from the image measured by the image sensor unit (51).

4. A weld bead inspection device that inspects weld beads on an outer surface of a pipe, the weld bead inspection device comprising
   a housing unit (10) that forms an appearance;
   an imaging unit (50) that images shapes of the weld beads in an inner space that is open downward from a middle inner side of the housing unit (10);
   a control unit (70) that is provided in the housing unit (10) to store image data captured by the imaging unit (50) or to calculate external shapes of the weld beads for determining welding quality using the image data; and
   a withdrawal supporting unit (20) that maintains an imaging position for the weld beads by the imaging unit (50) in response to a change in size of the pipe,
   wherein the imaging unit (50) is configured such that the imaging unit (50) images appearances of the weld beads in a tangential direction of the pipe.

5. The weld bead inspection device according to claim 4, wherein the withdrawal supporting unit (20) is configured
- to include a supporting block (21) that is provided to be capable of being withdrawn to front and rear of the housing unit (10) on the basis of the imaging position for the weld beads and supported on an outer surface of the pipe (21); and
- a fixing knob (22a) that temporarily fixes the supporting block (21) in a state in which the supporting block (21) is withdrawn to such a length that the fixing knob comes into contact with the outer surface of the pipe.

6. The weld bead inspection device according to claim 5, wherein the withdrawal supporting unit (20) has a rolling wheel (21a) at an end part of the supporting block (21) and is supported on the outer surface of the pipe by the rolling wheel (21a).

7. The weld bead inspection device according to claim 5, wherein the withdrawal supporting unit (20) is configured to further include a suspension (22) that maintains an original state in which the supporting block (21) is withdrawn from the housing unit (10) and elastically supports the supporting block (21) with respect to the housing unit (10) so as to be retracted into the housing unit (10) by contact and pressurization with the outer surface of the pipe.

8. The weld bead inspection device according to claim 5,
- wherein the withdrawal supporting unit (20) further includes an adjustment knob (22c) that drives the withdrawal and retraction of the supporting block (21), and
- wherein at least one of the housing unit (10) and the adjustment knob (22c) is provided with a scale indicator that guides a withdrawal dimension of the supporting block (21) or guides a dimension of the pipe corresponding to the withdrawal dimension.

9. A weld bead inspection device that inspects weld beads on an outer surface of a pipe, the weld bead inspection device comprising
- a housing unit (10) that forms an appearance;
- an imaging unit (50) that images shapes of the weld beads in an inner space that is open downward from a middle inner side of the housing unit (10);
- a control unit (70) that is provided in the housing unit (10) to store image data captured by the imaging unit (50) or to calculate external shapes of the weld beads for determining welding quality on the basis of the image data; and
- a bead tracking guide part (30) that guides the weld bead inspection device to travel along the weld beads when the weld bead inspection device travels on the outer surface of the pipe,
- wherein the imaging unit (50) is configured such that the imaging unit (50) images appearances of the weld beads in a tangential direction of the pipe, and
- wherein the bead tracking guide part (30) is configured to include a bead facing part (38) installed on at least one outer side surface of both outer side surfaces of the weld beads and capable of coming into contact with the at least one outer side surface.

10. The weld bead inspection device according to claim 9, wherein the bead facing part (38) is installed such that an installation position thereof is adjustable, or is installed in an elastic mount structure.

11. The weld bead inspection device according to claim 1, wherein the weld bead inspection device is formed such that the weld beads imaged by the imaging unit (50) are capable of traveling along an outer peripheral surface of the pipe in a posture where the weld beads are located to be biased in a lateral direction of the housing unit (10).

* * * * *